United States Patent

[11] 3,628,865

| [72] | Inventors | Harry Arthur Hele Spence-Bate<br>Stanmore, Middlesex;<br>John Michael Jones, Wembley, Middlesex,<br>both of England |
|---|---|---|
| [21] | Appl. No. | 833,640 |
| [22] | Filed | June 16, 1969 |
| [45] | Patented | Dec. 21, 1971 |
| [73] | Assignee | Harry Arthur Hele Spence-Bate<br>Kenton, Harrow, Middlesex, England |

[54] POSITIONING MECHANISM
9 Claims, 8 Drawing Figs.

[52] U.S. Cl. ..................................................... 355/53,
355/86, 352/188
[51] Int. Cl. ..................................................... G03b 27/42
[50] Field of Search ..................................................... 355/53, 54,
86, 95; 95/37; 353/27, 103; 352/188

[56] References Cited
UNITED STATES PATENTS

| 1,221,515 | 4/1917 | Davidson | 352/188 |
| 1,847,312 | 3/1932 | Seufert | 352/188 |

Primary Examiner—John M. Horan
Attorney—Irving M. Weiner

ABSTRACT: A positioning mechanism primarily for aligning a photographic film held in a movable frame, particularly applicable to microphotography where a high degree of accuracy is required, comprising a notched camway wherein the notches provide fine alignment for a coarser aligning means, these notches may be in a camway formed helically around a roller, a cam follower is provided linked to the frame and cooperating with the notches, the cam follower can be driven by the camway so that by turning the roller one way the frame is moved forward and turning the frame the other way the frame can be positioned, methods of reversing the travel of the frame at a preselected stage can be provided.

INVENTOR
HARRY ARTHUR HELE SPENCE-BATE ET. AL.
BY

ATTORNEYS

PATENTED DEC 21 1971

INVENTOR
HARRY ARTHUR HELE SPENCE-BATE ET.AL
BY

ATTORNEYS

POSITIONING MECHANISM

This invention relates to positioning mechanisms such as may be used for example in apparatus for copying documents and other material highly reduced upon photographic film for record-keeping purposes.

An object of the present invention is to provide an improved positioning mechanism which combines substantial accuracy with comparative simplicity.

The present invention consists in a positioning mechanism wherein notches are provided to locate a cam follower and thus an element in a predetermined position when the cam follower engages in one of said notches.

The invention further consists in a positioning mechanism as in the preceding paragraph wherein the notches are provided on a camway thus forming a notched camway, and wherein the camway serves to drive the cam follower from notch to notch.

In the accompanying drawings

Figure 1:
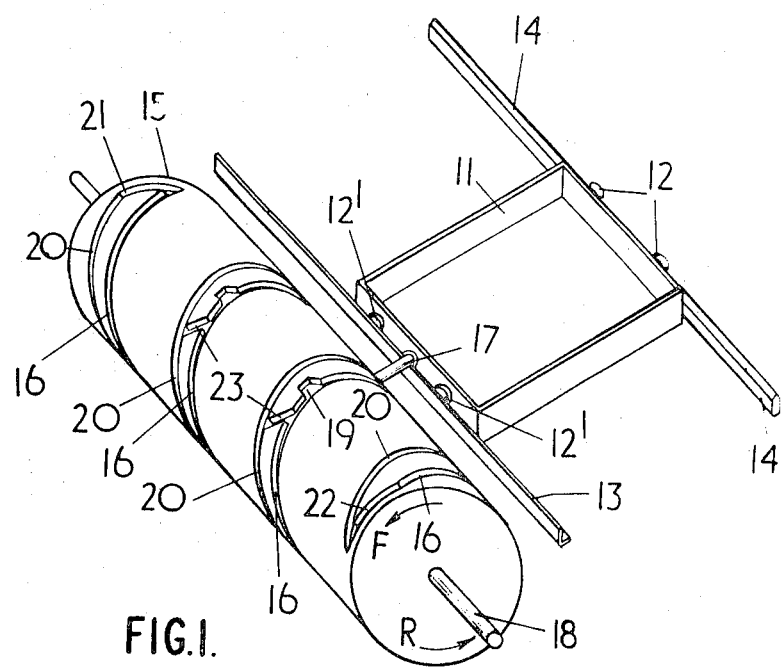
FIG. 1 shows a portion of a film transport and positioning mechanism embodying the present invention for use in a camera.

In carrying the invention into effect according to one convenient mode by way of example, a positioning mechanism will be described with reference to its use in an automatic microfiche camera (not shown) which includes a housing which encloses a lens system and arrangement for supporting beneath the lens documents or other matter to be copied, and an arrangement for supporting an unexposed sheet of photographic film above the lens in such a position as to receive a greatly reduced image of the document to be copied during a suitable exposure period determined, for example, by illuminating the document with an electronic flash. Such a sheet of photographic film with reduced images is known as a microfiche. Particular dimensions for microfiches are specified by British Standard 4187:1967. For example, a microfiche may consist of a sheet of film measuring 105 mm. by 148 mm. and may carry five or six rows of images.

It will be appreciated that suitable means in the form of a positioning mechanism must be provided for accurately repositioning the sheet of film between each exposure so that each image on the film is accurately located with respect to the other images within the desired tolerances.

This is achieved by means of a film transport mechanism (shown in part in FIG. 1) which consists of an outer fixed frame, a first movable frame 11 having rollers 12, running upon rails 14 and rollers 12' running on rails 13 secured to the fixed frame (not shown), to permit movement of the first movable frame 11 in a horizontal direction relative to the fixed frame, and a second movable frame (not shown) also having rollers, running upon rails (not shown) secured to the first movable frame to permit movement of the second movable frame relative to the first movable frame in a horizontal direction at right angles to the direction of movement of the first movable frame. To ensure accurate location of the first and second movable frames, the rollers 12 on one side of each frame may have V-shaped grooves to cooperate with a complementary V-shaped bearing surface on the associated rail 14. A further embodiment envisages having lozenge or square shaped rails and instead of rollers 12 there are provided pairs of rollers engaging on two sides of the lozenge or square. Individual rollers would have setting up adjustment.

The first movable frame 11 is arranged to be driven up and down its track by means of a cam roller 15 having a helical cam slot 16 arranged with its axis parallel to the direction of movement of the frame it drives, the cam roller being mounted upon the fixed frame with its cam slot 16 cooperating with a cam follower 17 fixed to the first frame 11.

The cam roller 15 is spring loaded upon a shaft 18 carrying a pinion (not shown) arranged to be driven by a worm gear itself driven by a servomotor. Rotation of the cam roller by the servomotor causes the first frame to be driven along the rails by the camming action of one side of the cam slot against the cam follower.

Figure 2:
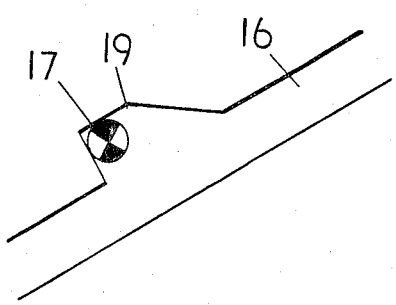
FIG. 2 shows a detail of FIG. 1.

Each time the first frame has been driven just past a desired position, the servomotor is reversed causing the first frame 11 to be moved for a short distance in the return direction with the cam follower 17 bearing against the opposite side of the cam slot 16 until such time as the cam follower 17 enters a notch 19 in that opposite side of the cam slot. As shown in FIG. 2, the cam follower is circular and engages a V-shaped portion of the notch 19 thereby achieving extremely accurate positioning of the first frame relative to the cam roller and thus to the outer frame, the cam follower being trapped in this position in the notch by over-driving the servomotor and allowing the spring loading of the roller to become stressed. This has the advantage that the carriage is always locked exactly in the right position while the servomotor has good latitude for stopping and can run on to some extent after the engagement of the cam follower due to the spring coupling of the roller.

When it is next desired to advance the first frame, the servomotor is energized in the forward direction when the cam follower moves out of the groove and is advanced with a camming action under the influence of the first side of the cam slot.

Since the opposite side of the cam slot 16 carries a number of notches 19, one for each predetermined position of the first frame, this cam slot 16 cannot be used for returning the first frame 11 to its starting position. Such return is achieved by means of a plain second helical cam slot 20 extending between the turns of the first slot and guides 21 and 22 are provided at each end of the cam roller so that when the cam follower reaches the end of the first cam slot, rotation in a direction R of the cam roller causes it to pass along guide 21 to the second cam slot and thereafter with continuous rotation of the cam roller 15 the first frame is returned to its original position as the cam follower 17 travels back along the second cam slot 20. When the cam follower 17 reaches the guide 22 the roller is again reversed to the direction F and returns to the beginning of the first cam slot 16.

Conveniently, the first cam slot may be provided with notches at intervals corresponding to one quarter of a turn of the cam roller. Where it is desired to change the spacing of the predetermined positions of the first frame, a fresh cam roller may be substituted with a first cam slot having a different pitch, or differing spacing of notches, or both.

In the embodiment shown in FIG. 1 the cam roller has further cross guides 23 provided to connect the first cam slot 16 and the second cam slot 20, at intermediate points along the slots. By this means return movement can take place before the end of the first cam slot 16.

The second frame is driven relatively to the first by means (not shown) similar to the drive for the first frame, i.e., a second cam roller is mounted upon the first frame and driven by a second servomotor and a second cam follower is mounted upon the second frame.

In an alternative arrangement (not shown), each cam roller may be provided with a cam slot of zigzag form with the apices of the slot modified so that when the cam roller is reciprocated the cam follower will pick up on the opposite sides of the slot and ensure movement of the cam follower in one direction. As before, the slot may serve both to advance the cam follower (and associated frame) and serve as means for positioning the follower and frame at each or alternate apices of the cam slot.

Although the expression roller has been used, it will be understood that the roller may be square or of other cross section instead of circular.

Figure 3:
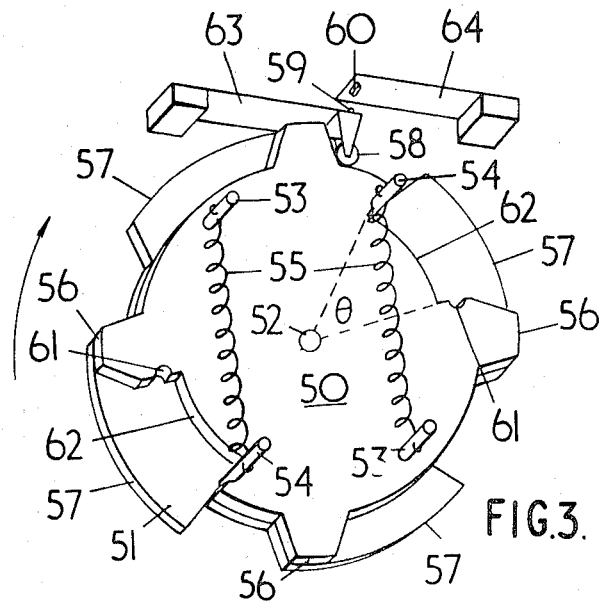
FIGS. 3 and 4 show a cam mechanism cooperating with the cam follower shown in either FIG. 1 or FIG. 5, for operating a switch used in a control circuit of an electrical motor of the rotation of the roller.
Figure 4:
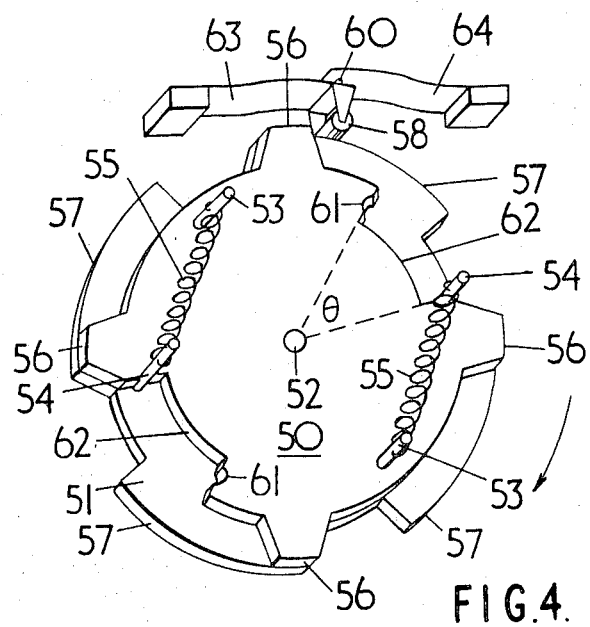

The servomotor driving the cam roller 15 is controlled by a circuit (not shown) in which there is a microswitch. This microswitch is operated by a tow-part cam mechanism shown in FIGS. 3 and 4. The cam mechanism in this embodiment is in two forms. One is used when positioning single fiches, and the other, which is shown in FIGS. 3 and 4, is used when positioning a double fiche or multiples thereof. As may be seen the second mechanism has two discs each having four camming steps. The first mechanism (not shown) is similar but only has two camming steps on each disc.

In FIGS. 3 and 4 the action of the two-part cam is shown. The cams 50 and 51 rotate about an axis of a shaft 52, the shaft being secured to cam 51. Cam 50 is allowed to be freely rotatable on the shaft except that it is linked to cam 51 by springs 55 which act between pins 53 projecting from and attached to cam 50 and pins 54 which project from and are attached to cam 51. Pins 54 are free to move under the influence of the springs 55 within the cutout portion 62 and between the limits 61.

Thus it can be seen cam 50 can rotate relative to cam 51 within the limiting arc $\theta$. It further follows that if the shaft 52 is rotated in a clockwise direction as seen in FIG. 3, cam 51 is rotated with it and drags cam 50 with it. Because cam 50 is rotating against resistance of microswitch roller 58 on contact arm 63, the springs 55 are thereby tensioned and the pin 54 moves to the position shown in FIG. 3 limited in its movement by a limit 61. The shaft is then rotated until microswitch roller 58 rises under the influence of a camming step 56 so that contact 59 mates with contact 60 on contact arm 64. At this point the rotation of shaft 52 is stopped and reversed, and a situation shown in FIG. 4 occurs. Here the springs 55 have taken charge of cam 50 and relatively have moved cam 51 round so that a camming step 57 now maintains the switch in a closed position.

Finally, the direction of rotation of the shaft 52 is reversed and the switch is allowed to break.

The purpose of the cam mechanism can be further explained in the fact that shaft 52 is connected or integral with shaft 18 of the cam roller. The rotation of the roller in the feed direction as shown in FIG. 1 coincides with rotation of the cams in a clockwise direction as shown in FIG. 4. The anticlockwise direction of rotation shown in FIG. 5 coincides with the rotation of the roller in the locational direction shown in FIG. 1. The length of the camming step 57 is such that the microswitch is maintained in a made position during the period of locational rotation of the roller and the further rotation of shaft 18 to obtain the tensioning of the roller notch 19 against the cam follower 17.

Figure 8:
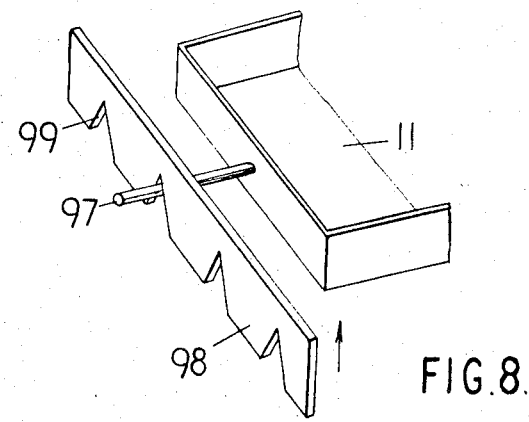
FIG. 8 shows a portion of an alternative film transport and positioning mechanism.

FIG. 8 shows another arrangement in which the frame 11 is arranged to be driven forwards and backwards by suitable means (not shown) such as rollers having helical cam slots, or rollers or gear action, the frame 11 having sufficient free movement or "play" at each predetermined position. Accurate final positions is achieved by lowering a bar 93 having V-shaped notches 99, the appropriate one of which engages and accurately locates a cam follower or spiggot 97 secured to the frame 11. If desired, the bar 98 may be replaced by a number of independently lowerable plates, each having one V-shaped notch.

The second movable frame is provided with a film carrier which includes a suction plate, the underneath surface of which has a plurality of apertures connected to a vacuum line so that a sheet of film may be held in a flat condition underneath the plate.

Figure 5:
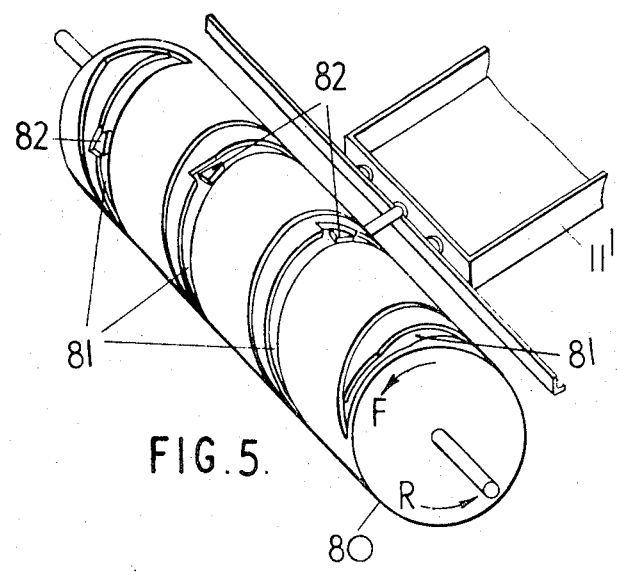
FIG. 5 shows a similar cam roller to FIG. 1 but with a reversing arrangement.
Figure 6:
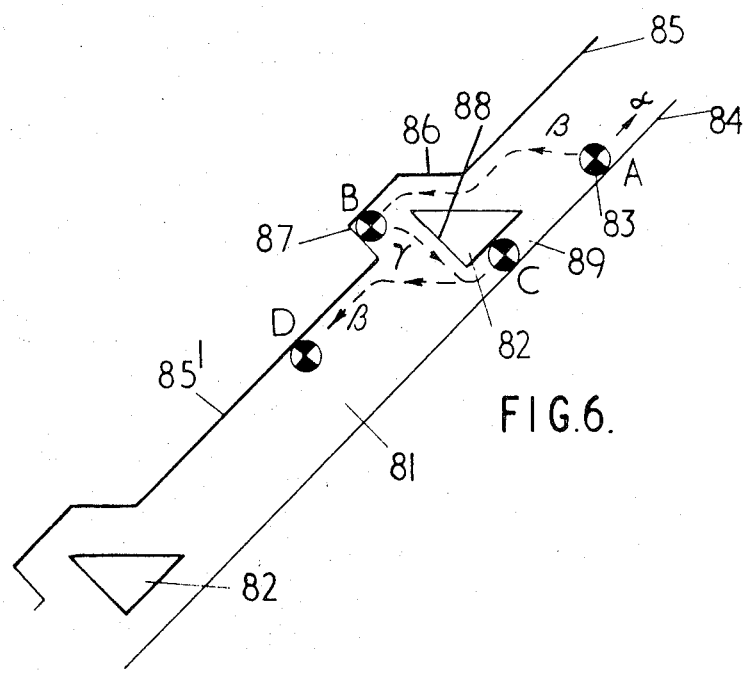
FIG. 6 shows a notch of the roller as shown in FIG. 5.

In a further embodiment shown in FIGS. 5 and 6 a positioning mechanism is constructed where the roller 80 as a wider cam slot 81 with a deflector 82 the roller is similar in function to that shown in FIG. 1 except that provision is made for the cam follower to be carried in either direction rather than the roller in FIG. 1 where the cam slot 16 can only carry the follower in the forward direction until it reaches the end of the roller uneven movement of the follower being permitted only so far as the immediately proceeding slot, but not beyond it.

The function of the roller as shown in FIG. 5 is better explained by diagrammatically opening out the cam slot as shown in FIG. 6. Here cam follower 83 can be seen located in the slot 81 with the deflector 82.

When the roller is rotated in the feed direction shown in FIG. 5 the cam follower 83 is caused to progress in a direction $\alpha$ and in FIG. 6 is shown at A against wall 84 of cam slot 81. On reversal of the roller 80 the cam follower 83 relatively moves in the direction $\beta$ against the opposite wall 85 of cam slot 81 and thence through the passage 86 between the wall 85 and the deflector 82, into the notch 87, to position B where it is tensioned in a similar way to the cam follower 17 shown in FIG. 2. On reversal of the roller the follower moves relatively in the direction $\gamma$ against the wall 88 of the deflector 82 and passes in to the passage 89 to position C on further reversal of the roller the follower comes back out of passage 89 in the direction $\beta'$ until it reaches the surface of wall 85 at position D.

It can thus be seen that by adding a deflector to the slot, reversal of movement of the cam follower along the slot can be obtain at almost any position in the slot. The exception being a short distance from B to a position on the way to C determined by such a factor as the angle of the helix on the roller. As this distance is small compared with the distance between one notch and the next it can be covered by simple electrical circuitry incorporated in the servomotor control circuit.

Figure 7:
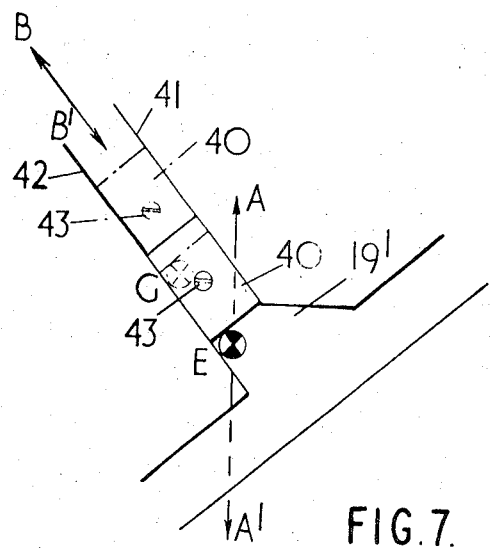
FIG. 7 shows a part of a camway similar to that shown in FIG. 2 with an adjustment insert.

There may be fitted to a notch an adjusting device for setting up the engaging position of the cam follower. This device is shown in FIG. 7. It consists of a slidable insert 40, which slides between walls 41 and 42'' which are an extension of notch 19 and which is held by a locking device, there shown as a screw 43.

The locking device can alternatively be a layer of solder applied to under surface of the insert which is locked and unlocked by the application of heat. If it is required to adjust the position E of the cam follower with the dependent frame, along the line A'A, it can be appreciated that a movement of the insert along the line B'B will bring the cam follower to new position G, thus effectively making a smaller adjustment along the line A'A.

It is envisaged that such a roller 80 can be made by such economical methods as moulding. It is convenient to use this roller in a microfiche reader where it is often desireable to backtrack in the record of the fiche and where accuracy as compared to the accuracy of position in a microfiche filming machine is not of such vital importance.

Although the invention has been described above with particular reference to a microfiche camera it will be appreciated that the transport system employing a fixed frame and two movable frames may be readily adapted in a microfiche projection system for transporting a developed microfiche into an appropriate position for viewing a selected image upon the microfiche.

It should be further emphasized that although the present invention is primarily intended for use in microfilm cameras and readers, the positioning mechanism according to the invention can be used in any device where accurate preselected positioning is required such as plotting tables. It has great advantages when used with a grid system since any fineness of grid can be reproduced by say allocating one positioning mechanism to whole coordinates and another to tenths and a further to hundredths and so on. In another application the preselected positions can be at irregular intervals and chosen to provide a control for an automatic machine tool or repetitive work. Yet another application would be selection retrieval of program boards in automatic spectrograph or a computer.

We claim:

1. A positioning mechanism comprising a positioning member movable in two direction, means defining a camway in said positioning member, means defining a series of spaced notches along said camway, a cam follower driveable in two directions in a substantially linear path along said camway and engageable in said notches, and an element driveable by said cam follower, said element being adapted for substantially linear movement, whereby said element is located in a predetermined position when said cam follower engages in one of said notches.

2. A positioning mechanism as defined in claim 1 for positioning a frame, wherein said positioning member is a cylindrically shaped roller, said camway is a helical groove formed around said roller and said cam is adapted to be in constant engagement with said camway.

3. A positioning mechanism as defined in claim 2, wherein the roller is provided with resilient means between the roller and a roller drive for tensioning the cam follower in a said notch.

4. A positioning mechanism as defined in claim 3 further comprising a second camway running parallel to said first camway and connected to said first camway whereby an endless camway is provided so that the cam follower can be returned to the beginning of said first camway.

5. A positioning mechanism as defined in claim 4 further comprising a deflector adjacent at least one said notch, the deflector comprising a triangular raised portion positioned so as to allow the cam follower to move on one side of the deflector into the notch and on the other side of the deflector on that wall of the groove forming the camway that is unnotched, whereby the cam follower can be moved in a direction reverse to that direction which is the direction in which the cam follower is driven along the camway.

6. A positioning mechanism as defined in claim 5 having a control mechanism for the motor driving the roller shaft comprising a two part camming mechanism consisting of at least two camming discs resiliently interconnected and one of which being drivably connected to the roller shaft, at least one of said camming discs being provided with steps for operating a switch, a second set of camming discs being provided to maintain the switch in an operating position when the roller drive is reversed.

7. A positioning mechanism as defined in claim 2 having a means for adjusting the position in which the cam follower is located in a notch comprising one side of the notch being bounded by an insert, said insert being slidable towards or away from the camway having the said notch, the insert being provided with a locking means, whereby by sliding the insert towards or away from the camway the location position of the cam follower is adjusted, and whereby on completion of adjustment the insert can be locked in the required position.

8. A positioning mechanism as defined in claim 1, including a bar, the longest side of said bar being substantially parallel to the directions of travel of said driveable element, wherein said series of spaced notches are formed along said bar, each of said notches having an apex substantially opposite its open side, said bar being movable in directions substantially perpendicular to the directions of movement of of said driveable element, and said notches are adapted to engage said cam follower whereby the cam follower is directed to position in the apices of said notches.

9. A positioning mechanism as defined in claim 8, further characterized in that said bar is comprised of a series of adjacently disposed plates, each of said plates have one of said notches, and each of said plates are independently movable in directions substantially perpendicular to the directions of movement of said driveable element.

* * * * *